(12) United States Patent
Cheong et al.

(10) Patent No.: US 10,219,298 B2
(45) Date of Patent: Feb. 26, 2019

(54) APPARATUS AND METHOD FOR CHANNEL ACCESS

(71) Applicant: ELECTRONICS AND TELECOMMUNICATIONS RESEARCH INSTITUTE, Daejeon (KR)

(72) Inventors: Min Ho Cheong, Daejeon (KR); Hyoung Jin Kwon, Daejeon (KR); Jae Seung Lee, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/706,085

(22) Filed: Sep. 15, 2017

(65) Prior Publication Data

US 2018/0007713 A1    Jan. 4, 2018

Related U.S. Application Data

(63) Continuation of application No. 14/425,617, filed as application No. PCT/KR2013/007979 on Sep. 4, 2013, now Pat. No. 9,807,797.

(30) Foreign Application Priority Data

Sep. 4, 2012  (KR) .................. 10-2012-0097761
Mar. 8, 2013  (KR) .................. 10-2013-0025310
(Continued)

(51) Int. Cl.
*H04W 74/04* (2009.01)
*H04W 48/16* (2009.01)
(Continued)

(52) U.S. Cl.
CPC .......... *H04W 74/04* (2013.01); *H04B 7/0408* (2013.01); *H04B 7/0617* (2013.01);
(Continued)

(58) Field of Classification Search
CPC ..... H04W 74/04; H04W 74/08; H04W 16/28; H04W 84/12; H04W 74/06; H04W 48/14; H04W 48/16; H04B 7/0408; H04B 7/0617

See application file for complete search history.

(56) References Cited

U.S. PATENT DOCUMENTS 8,369,257 B2    2/2013  Chu et al.
9,980,296 B2 *  5/2018  Wang ................ H04W 74/0875
(Continued)

FOREIGN PATENT DOCUMENTS

CN    1722640 A    1/2006
CN    1886902 A    12/2006
(Continued)

OTHER PUBLICATIONS

International Search Report for PCT/KR2013/007979 dated Sep. 4, 2013.
(Continued)

*Primary Examiner* — Kevin D Mew

(57) ABSTRACT

A channel access method of an access point (AP) having a sector antenna in a wireless local access network (WLAN) includes transmitting a sector beacon with respect to any one sector among a plurality of sectors, transmitting and receiving data with at least one station in any one sector during a pre-scheduled sector interval, sequentially performing transmission of the sector beacon and transmission and reception of the data with respect to remaining sectors of the plurality of sectors excluding the any one sector, transmitting an omni beacon with respect to all of the plurality of sectors, and
(Continued)

transmitting and receiving data with respect to at least one station of the plurality of sectors during a pre-scheduled Basic Service Set (BSS) interval.

13 Claims, 13 Drawing Sheets

(30) Foreign Application Priority Data

Mar. 13, 2013 (KR) .................. 10-2013-0026535
Sep. 4, 2013 (KR) .................. 10-2013-0105907

(51) Int. Cl.

| | | |
|---|---|---|
| *H04W 74/08* | (2009.01) | |
| *H04B 7/06* | (2006.01) | |
| *H04B 7/0408* | (2017.01) | |
| *H04W 84/12* | (2009.01) | |
| *H04W 16/28* | (2009.01) | |

(52) U.S. Cl.
CPC .......... *H04W 48/16* (2013.01); *H04W 74/08* (2013.01); *H04W 16/28* (2013.01); *H04W 84/12* (2013.01)

(56) References Cited

U.S. PATENT DOCUMENTS

| | | |
|---|---|---|
| 2008/0002632 A1 | 1/2008 | Pandey et al. |
| 2009/0232023 A1 | 9/2009 | Soffer et al. |
| 2009/0232035 A1 | 9/2009 | Cordeiro et al. |
| 2009/0233549 A1 | 9/2009 | Maltsev et al. |
| 2011/0205969 A1 | 8/2011 | Ahmad et al. |
| 2011/0305216 A1 | 12/2011 | Seok |
| 2013/0128798 A1* | 5/2013 | Liu .................. H04W 48/12 370/312 |
| 2013/0336184 A1* | 12/2013 | Kwon .................. H04W 74/002 370/311 |
| 2013/0336245 A1* | 12/2013 | Fischer .................. H04W 88/10 370/329 |
| 2014/0003414 A1* | 1/2014 | Choudhury .......... H04W 74/006 370/347 |
| 2015/0071211 A1* | 3/2015 | Seok .................. H04W 74/04 370/329 |
| 2015/0074772 A1* | 3/2015 | Jafarian .............. H04W 74/006 726/4 |
| 2015/0103767 A1* | 4/2015 | Kim .................. H04W 74/06 370/329 |
| 2016/0081085 A1* | 3/2016 | Jeong .................. H04W 72/0446 370/336 |
| 2016/0165630 A1* | 6/2016 | Oteri .................. H04W 74/04 370/336 |
| 2016/0242195 A1* | 8/2016 | Kwon .................. H04W 72/121 |

FOREIGN PATENT DOCUMENTS

| | | |
|---|---|---|
| KR | 10-2010-0122340 A | 11/2010 |
| KR | 10-2011-0043497 A | 4/2011 |
| WO | 2012093794 A2 | 7/2012 |
| WO | WO 2015/006537 A2 | 1/2015 |

OTHER PUBLICATIONS

Chittabrata Ghosh et al., "Restricted Access Window Signaling for Uplink Channel Access", IEEE 802.11-12/0843r0, Jul. 16, 2012, pp. 1-13, IEEE.

G. Redieteab et al., "PHY+MAC Channel Sounding Interval Analysis for IEEE 802.11 ac MU-MIMO" 2012, pp. 1054-1058, IEEE.

* cited by examiner

APPARATUS AND METHOD FOR CHANNEL ACCESS

CROSS REFERENCE PARAGRAPH

The present application is a continuation of and claims priority to U.S. application Ser. No. 14/425,617 filed Mar. 3, 2015, which is a U.S. National Stage of PCT/KR2013/007979, filed Sep. 4, 2013, which claims the priority of Korean Application No. 10-2013-0105907, 10-2013-0026535, 10-2013-0025310, 10-2012-0097761 dated Sep. 4, 2013, Mar. 13, 2013, Mar. 8, 2013, and Sep. 4, 2012, all of which are hereby incorporated by reference.

TECHNICAL FIELD

The present invention relates to a channel accessing apparatus and method in a wireless local access network (WLAN) system.

BACKGROUND ART

FIG. 1 is a diagram showing a hidden node problem occurring in a conventional WLAN system.

In the WLAN system, when a plurality of stations STA 111 and 112 in a same Basic Service Set (BSS) perform data transmission with respect to an access point (AP) 100 simultaneously, air-time collision inevitably occurs due to characteristics of a channel access scheme in view of collision avoidance, which is a hidden node problem.

In addition, even when stations located in different adjacent BSSs perform data transmission, an interference may also be generated as shown in FIG. 2, thereby reducing efficiency of data transmission originally desired. This is referred to as an overlapped BSS (OBSS) interference problem. FIG. 2 shows the OBSS interference problem occurring in the conventional WLAN system.

To relieve such problems, access chances of stations may be temporally distributed in every BSS to avoid collision on frequency resources. However, the foregoing expected object may also be achieved by spatially distributing channel access attempts using an AP with a sector antenna. Such a technology is called sectorization.

In general, the sector antenna includes a plurality of planar antennas and may control flickering of individual transmission antennas and reception antennas. A device functioning as the sector antenna may be implemented using a combination of multiple antennas and signal processing such as beam forming. The sectorization has not been used in the conventional WLAN nor even technically discussed, due to its operational inconvenience.

However, in case of institute of electrical and electronics engineers (IEEE) 802.11ah and IEEE 802.11af that use a sensor application, indoor/outdoor M2M, and extended range cellular offloading as a main application, coverage is increased up to about 1 km. Furthermore, as a number of stations managed by one BSS is increased up to several thousands to several tens of thousands, the hidden node problem and the OBSS interference problem become so serious that efficient data transmission cannot be performed at all. Accordingly, there is a demand for a technology of considerably reducing the problems by spatially dividing operation of stations through sectorization in the WLAN system.

DISCLOSURE OF INVENTION

Technical Solutions

According to an aspect of the present invention, there is provided a channel access method by an access point (AP) having a sector antenna in a wireless local access network (WLAN), the channel access method including transmitting a sector beacon with respect to any one sector among a plurality of sectors, transmitting and receiving data with at least one station in any one sector during a pre-scheduled sector interval, sequentially performing transmission of the sector beacon and transmission and reception of the data with respect to remaining sectors of the plurality of sectors excluding the any one sector, transmitting an omni beacon with respect to all of the plurality of sectors, and transmitting and receiving data with respect to at least one station of the plurality of sectors during a pre-scheduled Basic Service Set (BSS) interval.

The channel access method may further include performing a sector discovery process by performing sector sweep.

Effects of Invention

By applying sectorization in a wireless local area network (WLAN) system, a Basic Service Set (BSS) operation robust against a hidden node problem and an overlapped BSS (OBSS) interference problem may be achieved. In addition, the sectorization may be useful in electrical and electronics engineers (IEEE) 802.11ah and IEEE 802.11af that use a WLAN sensor application.

BEST MODE FOR CARRYING OUT THE INVENTION

Figure 1:
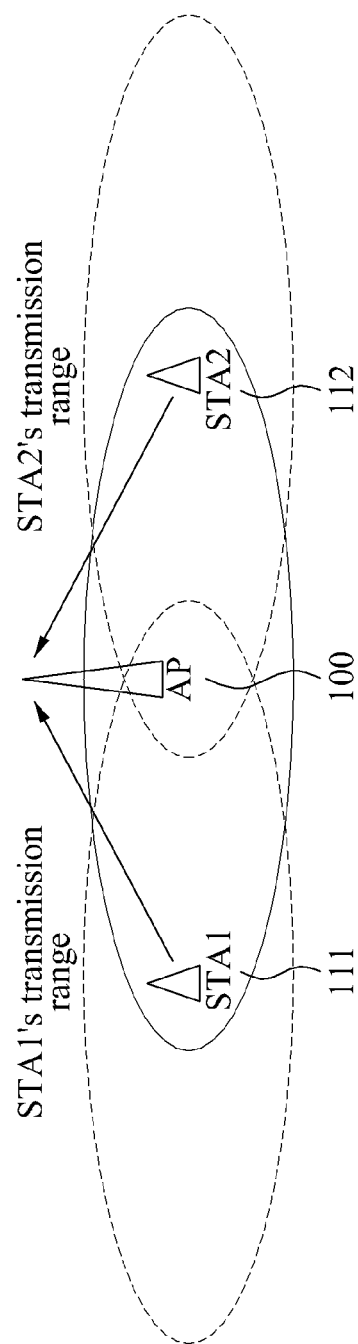
FIG. 1 is a diagram illustrating a hidden node problem occurring in a conventional wireless local area network (WLAN) system.
Figure 2:
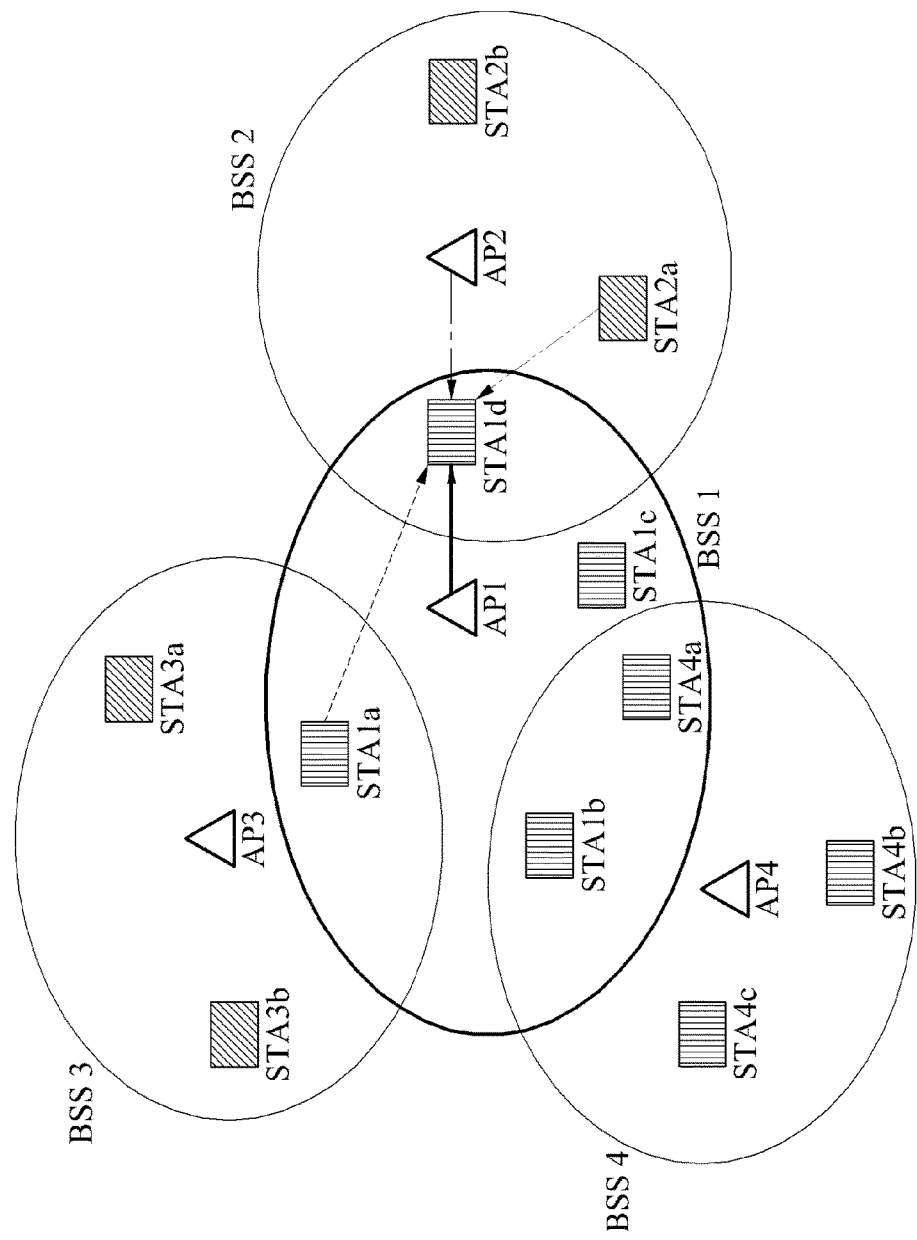
FIG. 2 is a diagram illustrating an overlapped Basic Service Set (OBSS) interference problem occurring in a conventional WLAN system.

Reference will now be made in detail to embodiments of the present invention, examples of which are illustrated in the accompanying drawings.

In explaining the embodiments of the present invention, generally known functions and structures will not be explained in detail not to obscure the scope of the invention. In addition, terms to be used below are defined to properly explain exemplary embodiments of the present invention and may vary according to users, user's intentions, or practices. Therefore, the definitions of the terms should be determined based on the entire specification. In the drawings, like reference numerals refer to the like elements throughout.

A channel access method according to an embodiment of the present invention refers to a channel access method of a Basic Service Set (BSS) including an access point (AP) including a sector antenna in a wireless local area network (WLAN) system.

Figure 3:
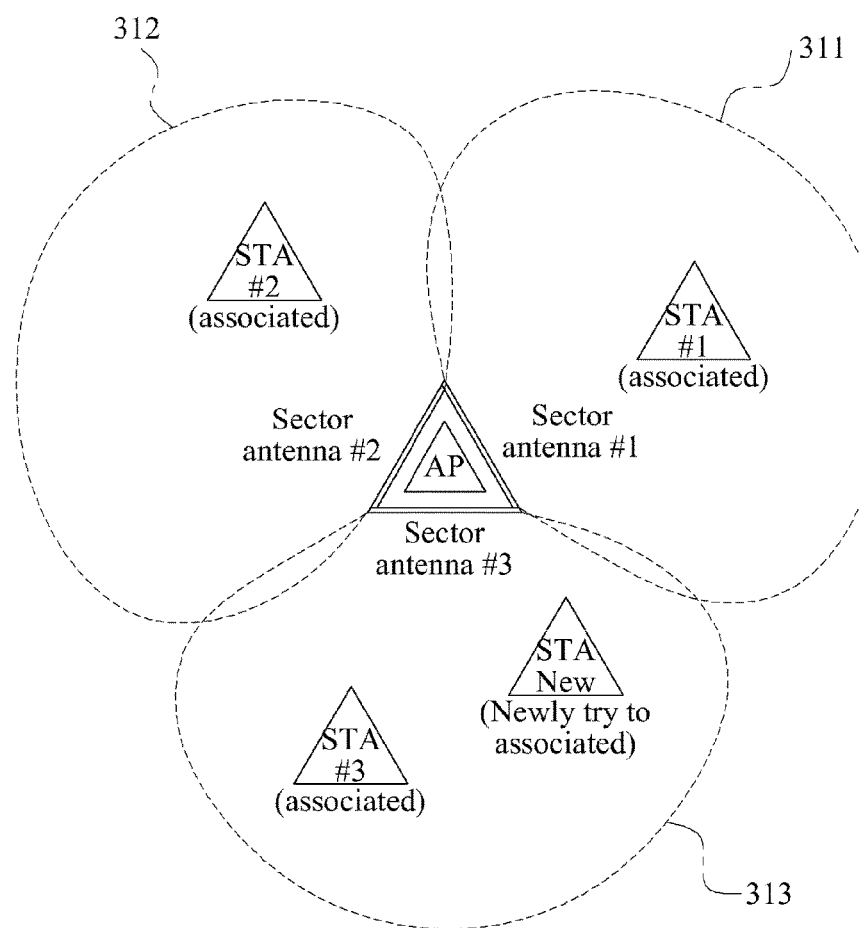
FIG. 3 is a diagram illustrating a spatial configuration of a BSS when a number of sectors is 3 in a WLAN system according to an embodiment of the present invention.

FIG. 3 is a diagram illustrating a spatial configuration of a BSS when a number of sectors is 3 in a WLAN system according to an embodiment of the present invention.

In the environment as in FIG. 3, the channel access method may temporally divide flickering time of sector antennas of an AP. Each of the sector antennas may be in charge of transmission and reception of stations located in each direction. That is, the AP may distinguish flickering times of a first sector 311, a second sector 312, and a third antenna 313.

Figure 4:
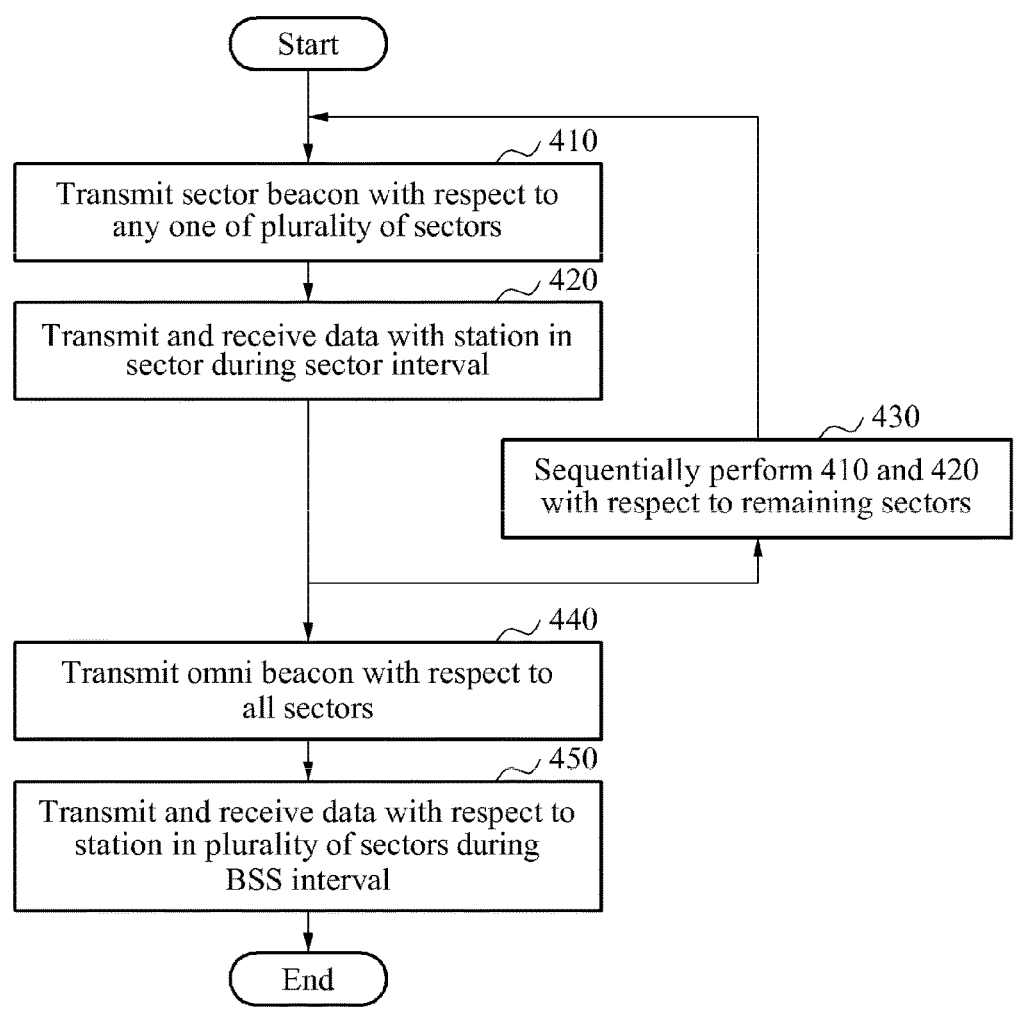
FIG. 4 is a flowchart illustrating a channel access method by an access point (AP) having a sector antenna in a WLAN system according to an embodiment of the present invention.

FIG. 4 is a flowchart illustrating a channel access method by an AP having a sector antenna in a WLAN system according to an embodiment of the present invention.

In operation 410, the channel access method may transmit a sector beacon with respect to any one sector among a plurality of sectors.

In operation 420, the channel access method may transmit and receive data with respect to at least one station in any one sector that transmitted the sector beacon during a predetermined sector interval. That is, according to the channel access method, data transmission and reception of stations in each sector may be performed within a sector interval with respect to a sector of which a corresponding station is mapped.

After the sector interval is elapsed, in operation 430, the channel access method may sequentially perform transmission of the sector beacon with respect to remaining sectors among the plurality of sectors (operation 410) and transmission and reception of data (operation 420). This will be described again with reference to FIG. 5.

After the sector beacon transmission and the data transmission and reception are completed with respect to all sectors, the channel access method may transmit an omni beacon with respect to the all sectors in operation 440 because the omni beacons are necessary to be equally transmitted to the all sectors even in case of sectorization, for association, passive scanning, broadcasting, and multi-sector transmission.

In operation 450, the channel access method may transmit and receive data with respect to at least one station in the plurality of sectors during a predetermined BSS interval.

Depending on embodiments, as to a traffic indication map (TIM), the channel access method may notify a TIM with respect to a sector-dedicated station in the sector beacon, and the other matters in the omni beacons.

With respect to other transmission and reception such as sector-dedicated transmission and reception, broadcasting, multi-user multiple input multiple output (MU-MIMO) across sectors, and the like, the channel access method may temporally distinguish by sector intervals and BSS intervals.

Depending on embodiments, the channel access method may return partial time periods even in the sector interval for transmission and reception of other sectors or multi-sectors.

In case of a non-TIM device that allows staying in a sleep mode without listening to the beacon, since the non-TIM device is unaware of its sector number, the channel access method may allow omni-directional transmission and reception and also allow to awake the BSS intervals in which temporal periods are fixed.

Figure 5:
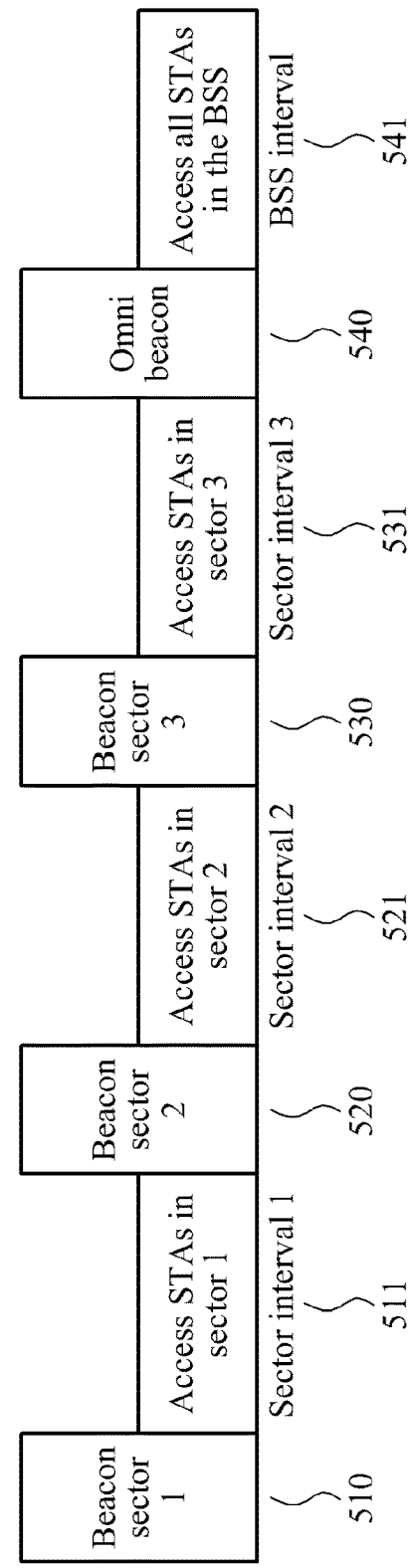
FIG. 5 is a diagram illustrating a beacon and an interval in a sectorized case, according to an embodiment of the present invention.

The channel access method may map the sector beacon and the omni beacon with relationships between a short beacon and a full beacon in consideration of frequency of the sector beacon and the omni beacon. FIG. 5 shows an example of the foregoing process.

FIG. 5 is a diagram showing a beacon and an interval in a sectorized case, according to an embodiment of the present invention.

Referring to FIG. 5, when the number of sectors is three, the channel access method may transmit a sector beacon 510 with respect to a first sector. During a predetermined first sector interval 511, the channel access method may transmit and receive data with respect to at least one station of a first sector.

After the first sector interval 511 is elapsed, the channel access method may transmit a sector beacon 520 with respect to a second sector. During a predetermined second sector interval 521, the channel access method may transmit and receive data with respect to at least one station of a second sector.

In the same manner, after the second sector interval 521 is elapsed, the channel access method may transmit a sector beacon 530 with respect to a third sector. During a predetermined third sector interval 531, the channel access method may transmit and receive data with respect to at least one station of a third sector.

After the third sector interval 531 is elapsed, the channel access method may transmit an omni beacon 540 with respect to all sectors. During a predetermined BSS interval 541, the channel access method may transmit and receive data with respect to at least one station of the first sector, the second sector, and the third sector.

Depending on embodiments, the channel access method may transmit the omni beacon by broadcasting irrespective of the sectors. In addition, the channel access method may record information on TIM with respect to all remaining cases except for a particular sector-dedicated case and window time per group. Here, the RAW for the sector-sweep, the multi-sector MU-MIMO transmission, and broadcast transmission may be included. The sector-sweep will be described in detail later.

The channel access method may also record time information related to return or re-return of time periods to other sectors in each sector interval. Depending on embodiments, the channel access method may include contents of the sector beacon again in the omni beacon.

According to an aspect of the present invention, a receiving mode of a sector antenna of an AP may be omni-directional.

When a station is to perform association without listening to the beacon, the station may try active scanning. Here, since the AP is yet unaware of a region including the station trying the active scanning, the receiving mode of the sector antenna may be set to the omni-directional mode so that the AP successfully receives a probe request. That is, the antenna of the AP may be set to perform sector transmission only when performing downlink transmission. Depending on embodiments, since the probe request is received omni-directionally and a probe response may be transmitted also omni-directionally, the channel access method may use an exchange sequence informing of location of the sector, by referencing a sweeping omni beacon later.

Depending on embodiments, the channel access method may use a sector capabilities information element (I.E.) including a sectorized beam capable field, a sectorization type field, a total sector number field, and the like, for sector capabilities exchange. A table below shows the sector capabilities I.E.

TABLE 1

| Elements ID | Length | Sectorized beam capable | Sectorization type | Total sector number | Reserved |
|---|---|---|---|---|---|
| 8 | 8 | 1 | 2 | 4 | 1 |

In the channel access method according to the embodiment of the present invention, when dot11S1GSectorImplemented is true, the station may set a value 1 for the sectorized beam capable field of the sector capabilities element in an association request frame. The station may also set a value for the sectorized type field according to whether the sectorization operation is a type 0 or a type 1, in the sectorized capabilities element. The sectorization operation type will be described again later. When dot11S1GSectorImplemented is false, the station may set a value 0 for the sectorized beam capable field of in the sectorized capabilities element.

When dot11S1GSectorImplemented is true, the AP may set a value 1 for the sectorized beam capable field of the sector capabilities element in the association request frame. The AP may set a value for the sectorized type field according to whether the sectorization operation is a type 0 or a type 1, in the sectorized capabilities element, and set a value for the sectorized type field to indicate a total number of the set sectors. When dot11S1GSectorImplemented is false, the AP may set a value 0 for the sectorized beam capable field in the sector capabilities element.

In addition, according to the channel access method according to the embodiment of the present invention, a sectorized beam-capable AP capable of transmitting a sectorized beam may allocate or reallocate a particular sector identifier (ID) to a sectorized beam-capable station (STA) capable of receiving the sectorized beam after the association. A sectorized beam-capable STA capable of transmitting the sectorized beam may selectively transmit a sector ID feedback to the sectorized beam-capable AP capable of receiving the associated sectorized beam. The sectorized beam-capable STA capable of transmitting the sectorized beam may selectively request sector training of the sectorized beam-capable AP capable of receiving the associated sectorized beam.

The channel access method may further perform a sector discovery process by performing the sector sweep.

This is because the stations are unaware of corresponding sectors the stations belong to during the association and therefore additionally need the sector discovery process to discover the corresponding sectors. Here, the association may be performed through the omni-beacon. The sector sweep may be performed using a temporally fixed or varied location.

Hereinafter, the sector discovery process will be described in detail.

In case of the sectorization, the stations need to find the corresponding sectors and also need to share the information, that is, the corresponding sectors, with the AP so that the AP may provide the corresponding sector interval period with transmission and reception chances with respect to the stations.

In addition, the channel access method may perform the sector sweep for listening of several sectors without temporal overlap so as to perform the sector discovery process stably and reliably.

Depending on embodiments, the channel access method may define the sector sweep as a signal sequence of a no data protocol (NDP) type. Therefore, the channel access method may reduce time duration. The NDP type sector sweep may be illustrated as shown in FIG. 6.

Figure 6:
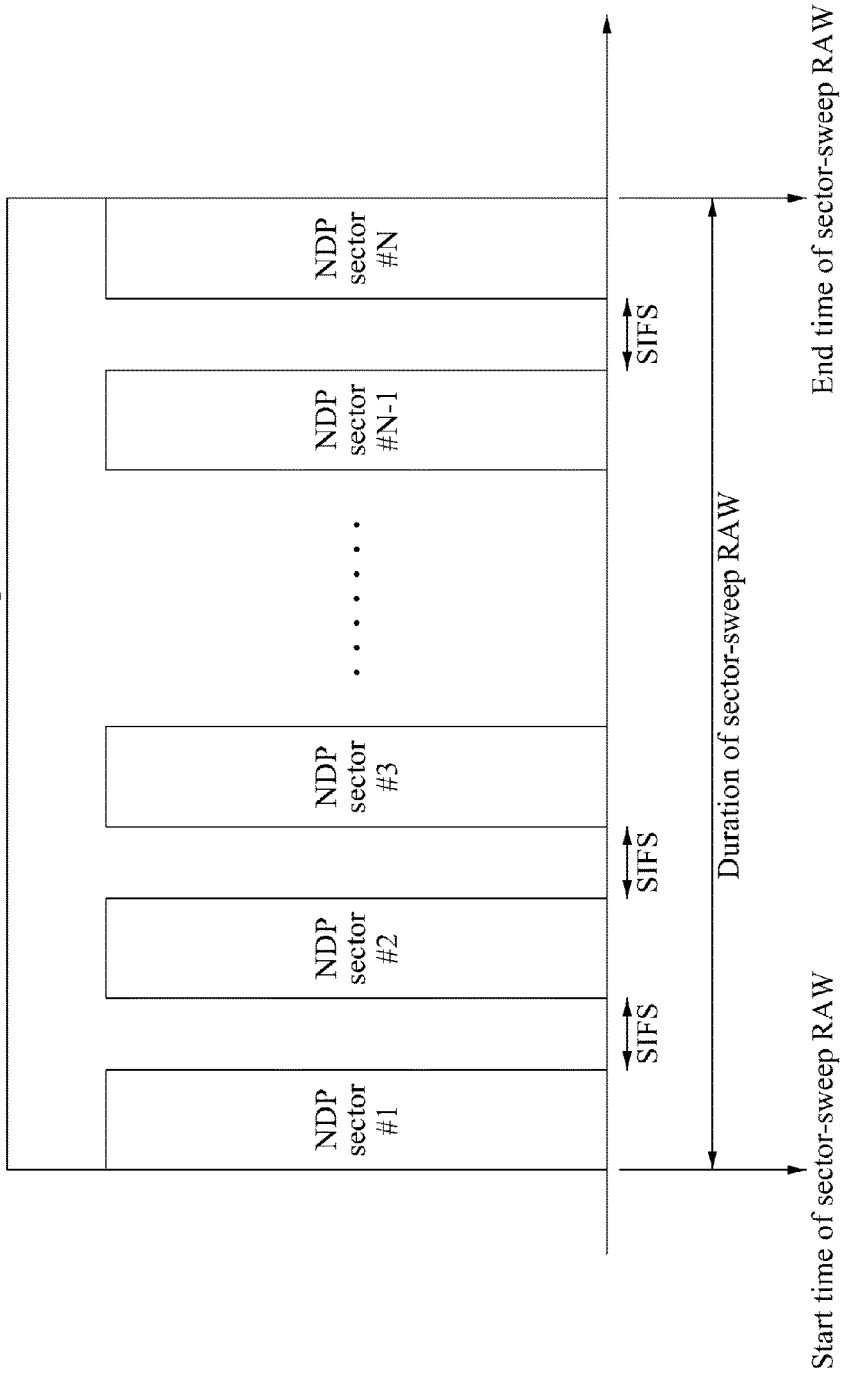
FIG. 6 is a diagram illustrating a temporal configuration of a sector sweep according to an embodiment of the present invention.

FIG. 6 is a diagram illustrating a temporal configuration of a sector sweep according to an embodiment of the present invention.

Referring to FIG. 6, an NDP sector sweep signal may include STF-LTF1-SIG without data. The NDP signal of each sector may include at least one piece of information selected from a total number of sectors, a current sector number of this NDP, an AP address, and the like.

Depending on embodiments, the channel access method may use a 1 MHz or 2 MHz preamble format in case of 1 MHz or 2 MHz BSS of 802.11ah. In case of 4/8/16 MHz BSS, the channel access method may use a signal (SIG) with respect to a previous channel or a frequency duplicate type SIG of 1 MHz or 2 MHz.

Signals of each sector NDP may include at least one piece of information selected from the total number of sectors, the NDP, the AP address, and the like.

A following table shows a configuration of a SIG bit field of the NDP sector sweep in the 1 MHz BSS of 802.11ah.

TABLE 2

| Field | Bit width | Comments |
|---|---|---|
| Message type indicator | 4 | Unused MCS field in normal data packet |
| TA | 9 | (partial) BSSID |
| Total number of sectors | 4 (or less) | |
| Current sector number | 4 | 0~15 |
| Reserved | 5 | |
| Tail bits | 6 | TBD (Depending on group's decision on tail bit support) |
| CRC | 4 | |
| TOTAL | 36 | 2 MHz case, there are 12 reserved bits |

Depending on embodiments, the channel access method may designate the sector sweep as a restricted access window (RAW). Since the sector sweep is designated as the RAW, reduction in the sector discovery efficiency by transmission and reception of another random sector or sectors may be prevented. Also, reduction in transmission and reception efficiency caused by the sector discovery may be prevented. The channel access method may not allow transmission and reception of other purposes during a corresponding time period since the sector sweep is designated as the RAW.

The channel access method may perform the sector sweep in a BSS interval. That is, the NDP sector sweep protected by the RAW may be indispensably arranged in the BSS interval by scheduling information per access group provided by the omni beacon.

Depending on embodiments, in a passive scanning device, the indispensable RAW of the NDP sector sweep may be arranged right after the omni beacon or after a short inter frame spacing (SIFS) time, so that the channel access method may enter the association being aware of the sector in advance after listening to the omni beacon.

Here, the omni beacon may include a location of the sector sweep in a pre-scheduled BSS interval. That is, the location of the NDP sector sweep RAW may be pre-scheduled in the BSS interval or notified in advance by the omni beacon.

Depending on embodiments, the channel access method may arrange the NDP sector sweep RAW not only in the BSS interval but also in a time period exceptionally allowed for multi sector transmission and reception so that the sector discovery process may be quickly performed without having to wait until the BSS interval. Thus, even when the NDP sector sweep RAW is arranged in the sector interval, the channel access method may pre-schedule the location of the NDP sector sweep RAW and notify the location through the omni beacon.

The station may discover its optimal sector through the sector discovery process. When the optimal sector is found, the station may report the result to the AP. Here, the station may report through an association request or through a dedicated frame requesting association identification (AID) reassignment.

Through the sector discovery process, the channel access method may receive the result of discovering the optimal sector of the station from the station. Depending on embodiments, the channel access method may further perform confirmation of the AP through transmission of the corresponding sector with respect to a corresponding sector number of the station.

Each station may discover its optimal sector by receiving a mandatory sector sweep RAW located in the BSS interval or receiving a predetermined additional sector sweep RAW located in an exceptional period in the sector interval. However, the station may request the sector discovery even with respect to a period in which the sector sweep RAW is not notified in advance by the omni beacon. In addition, based on the sector discovery request, the station may transmit the additional sector sweep RAW according to determination by the AP.

Thus, the channel access method may perform a fast sector discovery process. In detail, the channel access method may receive a sector discovery request from a station to perform the fast sector discovery with. Also, the channel access method may perform the additional sector sweep besides the predetermined sector sweep. In addition, the channel access method may receive a result of the fast sector discovery process from the station.

Even with respect to the period in which the sector sweep RAW is not pre-scheduled, the channel access method may additionally have an exceptional sector sweep RAW during a time period returned to other sectors of the sector interval, based on the fast sector discovery request transmitted from the station, that is, through the determination by the AP.

According to such a process, when the station transmits the sector discovery request, which may include an AP address, to the AP and when the AP transmits the additional sector sweep through the determination based on the request received from several stations, the corresponding stations may report the found sector. During the fast sector discovery request, the station may also transmit urgency of discovery to the AP.

Figure 7:
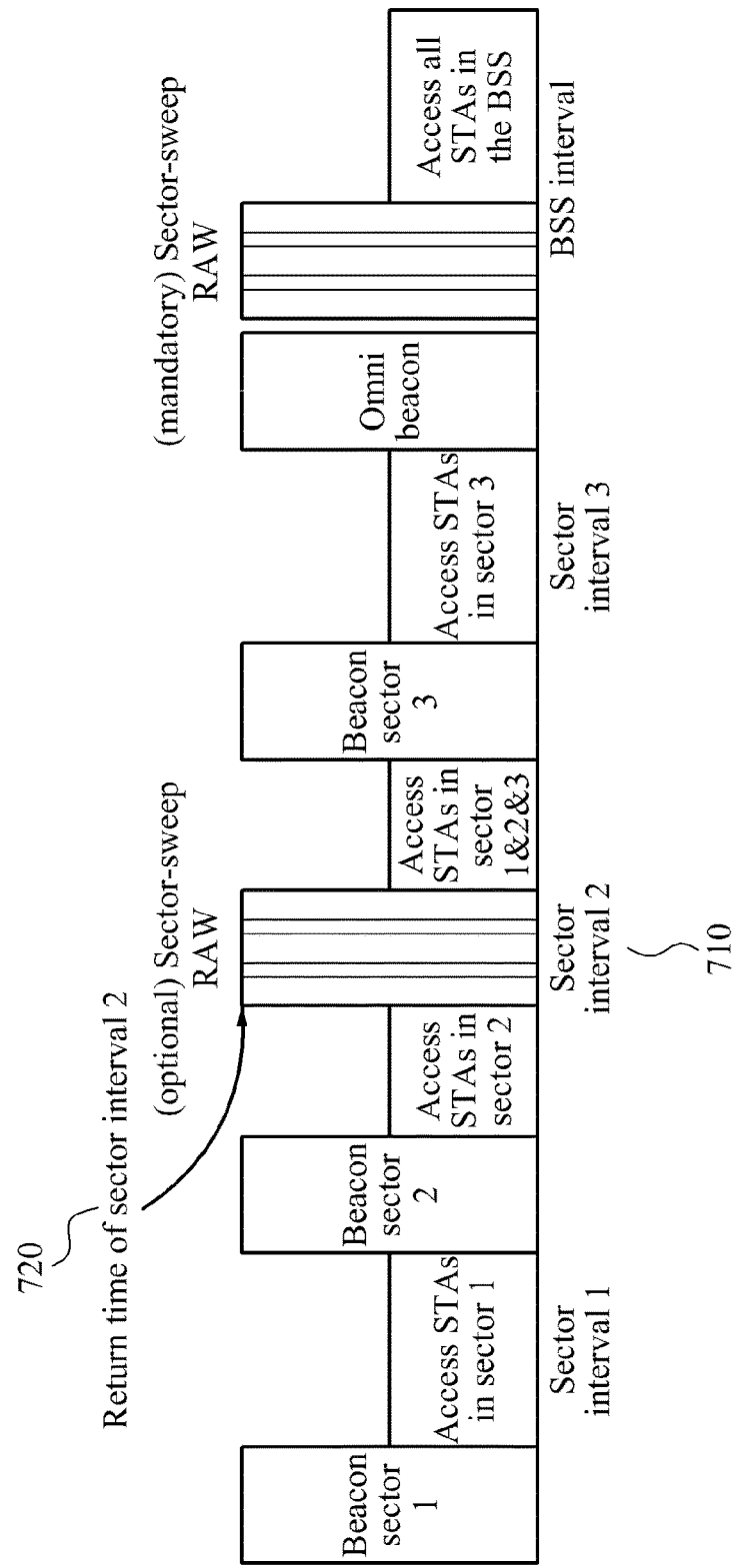
FIG. 7 is a diagram illustrating an operation in which a channel access occurs in a sector interval.

FIG. 7 is a diagram illustrating an operation in which a channel access occurs in a sector interval.

As described above, data transmission and reception of each station may be performed only within a sector interval mapped with the station. The channel access method may insert an additional RAW by logical grouping according to a device type and the like in the sector interval. When sector dedicated RAWs, which are prescheduled in the sector interval and notified by the sector beacon and the omni beacon, are expired, remaining time of the sector interval may be returned for additional resources used for transmission and reception of the sector and all sectors.

For example, when data transmission and reception with stations of a predetermined second sector is completed before a sector interval 710 with respect to the second sector is all elapsed, the channel access method may return remaining time 720 of the sector interval 710 with respect to the second sector so that other sectors may use the remaining time 720.

Such return may also be prescheduled and notified in advance by the omni beacon. However, when unscheduled necessity of return occurs, the channel access method may notify the return by sending sync frames to all sectors or to sectors available after the return through omni directional transmission. The sync frame may be an NDP type sequence that includes the AP address such as BSSID and a combination of numbers of the sectors available after the return. The combination of the available sector numbers may record sector numbers added to an original sector. Here, when re-return to the original sector is necessary, the channel access method may use the sync frame of the same use.

The channel access method may have the NDP sector sweep right after the return time with respect to other sectors when having the additional NDP sector sweep in the sector interval.

Hereinafter, various embodiments applicable to the foregoing channel access method will be described.

The channel access method may configure an omni beacon in the form of sweeping of a sectored beam. Through this, the channel access method may solve a coverage mismatch between the omni beacon and a sector beacon.

Depending on embodiments, according to the channel access method, information on a time slot and a sector for allocation before the beacon transmission may be appointed between the AP and the station.

The channel access method may adjust each sectored time window by reflecting that distribution of stations may be varied according to a direction from the AP.

According to the channel access method, since the AP is aware of a relative angular position of the non-TIM device, the AP may determine window distribution. Therefore, according to the channel access method, it may be prevented that the AP may not even listen an entering of the non-TIM device, which is different from in the logical grouping.

Depending on embodiments, even in the same BSS, the channel access method may be affected or not affected according to sectors due to overlapped BSS (OBSS). Therefore, a channel which is unavailable due to interference in a particular sector may be available in other sectors. Thus, the channel access method may be applied differently according to the sectors.

To achieve MU-MIMO grouping, which is more proper in view of channel orthogonality, by stations belonging to different sectors, the channel access method may inevitably set a window capable of simultaneous transmission of a plurality of sectors.

When the station moves from a sector to another sector, an address change in a TIM map may be included so that the AP is aware of the sector to which the station is moved. In addition, the channel access method may use a reassignment protocol, and additionally use a protocol similar to a TIM/non-TIM switch, which notifies various changes occurring in the logical grouping.

Figure 8:
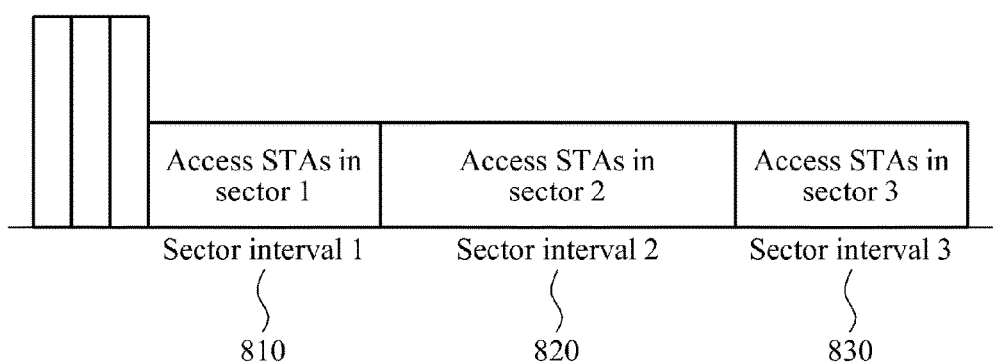
FIGS. 8 and 9 are diagrams illustrating a beacon message and an interval in a WLAN system according to another embodiment of the present invention.
Figure 9:
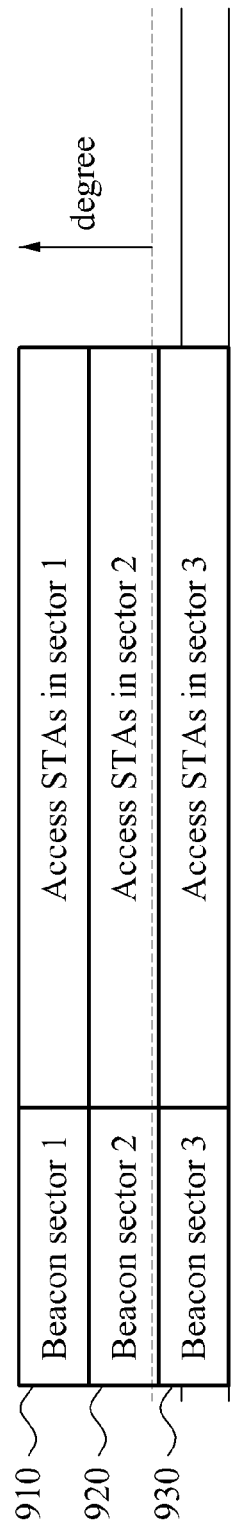

FIGS. 8 and 9 are diagrams illustrating a beacon message and an interval in a WLAN system according to another embodiment of the present invention.

Referring to FIG. 8, the channel access method according to the embodiment of the present invention may use only one beacon as concatenated beam sweeping. In this case, a first sector interval 810, a second sector interval 820, and a third sector interval 830 may be concatenated.

Referring to FIG. 9, the channel access method may transmit a sectored beacon for each sector at the same time. In this case, a beacon 910 with respect to a first sector, a beacon 920 with respect to a second sector, and a beacon 930 with respect to a third sector may be simultaneously transmitted.

According to the channel access method, a sectorized beam training/feedback may be used for the AP to allow learning an optimal sector for the station. Here, the AP may transmit a sectorized beam along with sector/group IDs. The station may observe which sector is optimal and feedback the sector/group ID to the AP. Since the optimal sector may be stabilized as to a fixed station, the feedback may be necessary only once or not frequently. The AP may be aware of the optimal sector of the station. The AP may associate with stations of a particular group based on the sector of the station.

Figure 10:
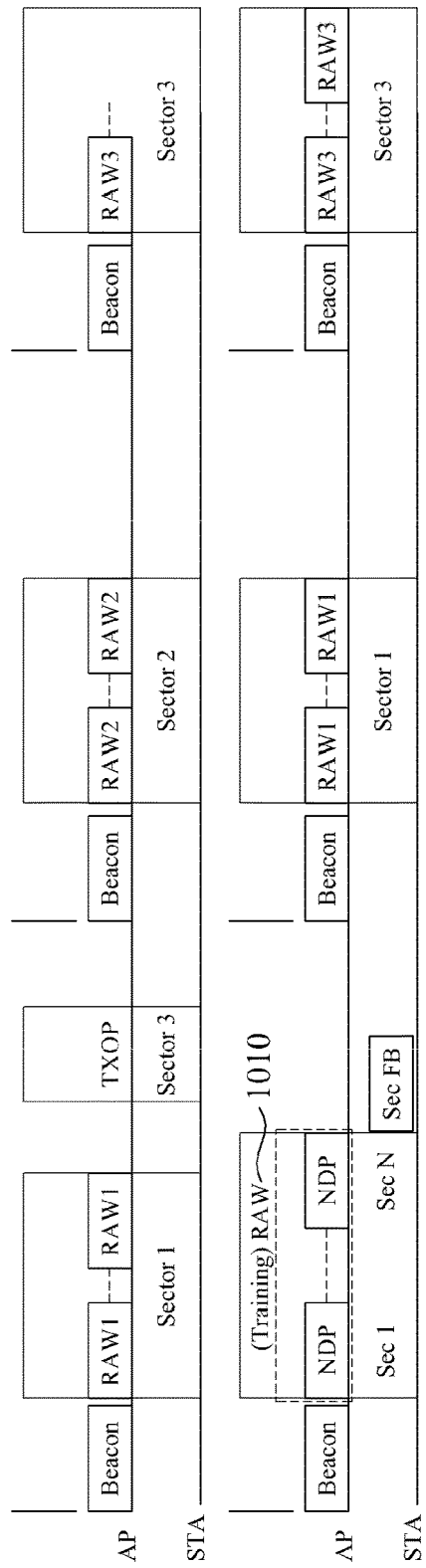
FIG. 10 is a diagram illustrating sectorized beam operation according to an embodiment of the present invention.

FIG. 10 is a diagram illustrating sectorized beam operation according to an embodiment of the present invention.

Referring to FIG. 10, the AP may transmit omni beacons having a periodical sector beam training session 1010. The station may transmit a sector/group feedback to the AP, and the AP may associate with the station through a particular group corresponding to the sector of the station. The AP may switch the sectorized beam operation during a particular transmission opportunity (TXOP) with respect to one station in a RAW with respect to a particular TIM group or in one sector. During a RAW using an NDP, for example sounding NDP with Nsts=1, sector beam training may be located after a beacon. The AP may have a fixed schedule related to the training RAW. A station sector/group feedback format is to be defined.

According to the channel access method, (NDPA+) NDP or new frames of a sector sweep may be used to reduce time duration. The sector sweep may be grouped as an independent RAW to prevent influences between data transmission and sector sweep by sectorized or omni-directional transmission. In addition, the sector sweep grouped as a RAW may come at a predetermined time indicated by a Global Packet Radio Service (GPRS) included in the omni beacon. Here, the sector sweep RAW may include at least one piece of information selected from a total number of sectors, a current sector number per sector number, duration start time of a sector report RAW with respect to each sector per sector frame, an AP address, a spatial stream number, a bandwidth (BW), and the like.

Figure 11:
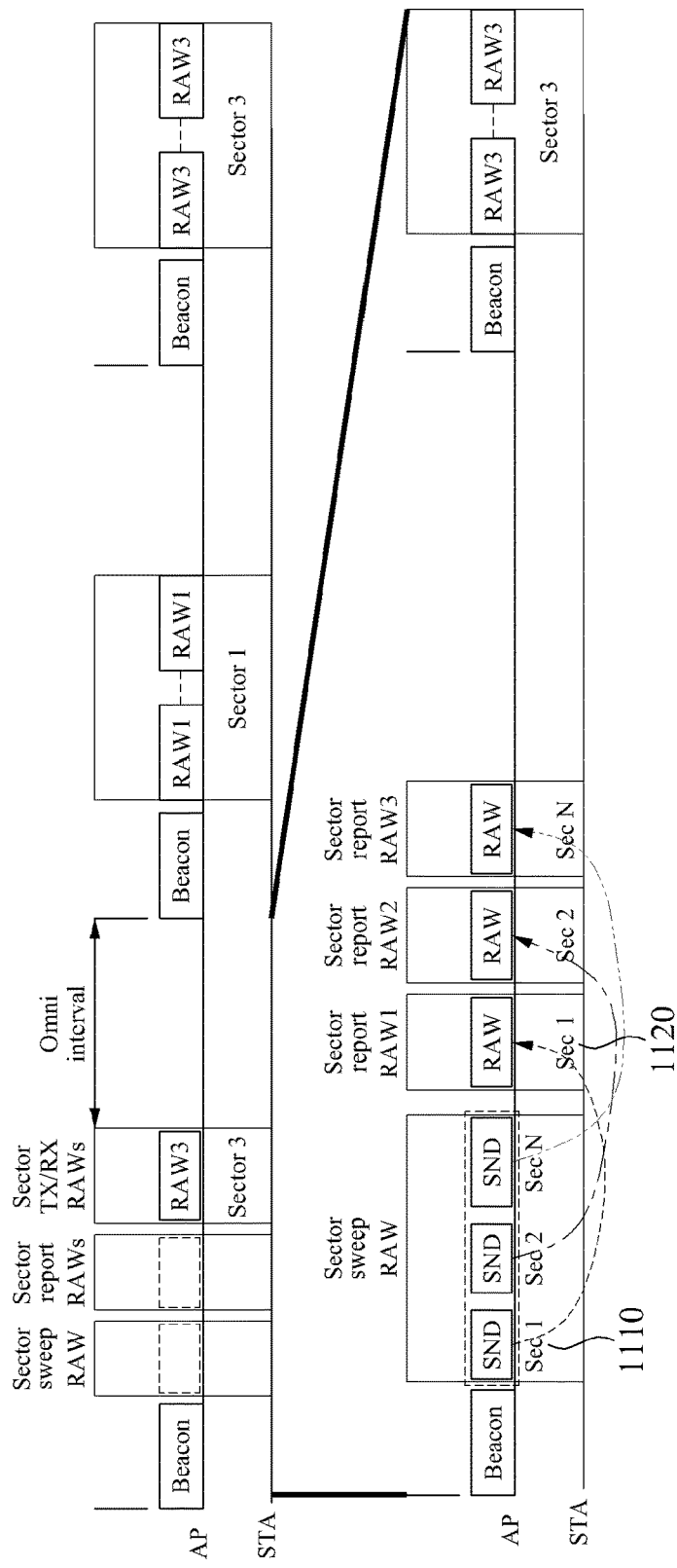
FIG. 11 is a diagram illustrating a beacon message according to yet another embodiment of the present invention.

After the station learns the sector number by receiving the sector sweep, the station may report a sector number of the station to the AP during a BSS interval following the sector sweep. To avoid interference from general sector data transmission or omni-directional data transmission, a corresponding sector may have a dedicated RAW for the sector report with respect to the station having learned the sector number to match a sectorized coverage between a transmitter TX and a receiver RX. For example, referring to FIG. 11, the station having learned the sector number according to a first sector sweep RAW 1110 may transmit a first sector report RAW 1120 to the AP. In the same manner, the station having learned the sector number according to a second sweep RAW may transmit a second sector report RAW to the AP. Also, the station having learned the sector number according to a third sweep RAW may transmit a third sector report RAW to the AP.

According to the channel access method, when all beacons are omni beacons, all beacon intervals may be used as RAWs according to determination by the AP with respect to the sector or omni. All scheduling information may be supported by GRPS information in the omni beacons.

When the beacons include sector beacons and one omni beacon, sector beacon intervals may be used basically for data transmission for the sector. An omni beacon interval, that is, the BSS interval, may be used basically for omni or multi sector data transmission. Additionally, a remaining duration of the sector beacon intervals may be allowed to be returned by omni-directional or multi sector data transmission. The GRPS information in the omni beacons may include at least one piece of information selected from a duration starting time of sector-dedicated RAWs during each sector interval, duration which may reiterate in a GRPS of an omni-full beacon, and the like.

Another embodiment of the fast sector discovery process will now be described.

Depending on embodiments, the sectorization type may be plural. For example, the sectorization type may be two types including a type 0 which is the beacon interval based on the sector and a type 1 which is a RAW or TXOP based on the sector. The beacon type may be plural. For example, the beacon type may be two types including the sector beacon (type 0) and the omni beacon (type 0 or type 1). Sector capabilities exchange may include sector transmission capable of an AP during association, a sector report capable of the station, and a total number of sectors. In case of sector operation indication, a period of the sector beacon, a predetermined sector ID/group ID (type 0), and a next sector training time (type 1) may be in the beacon or a response state. In case of an AID change, a first AID may be acquired based on the sector or an AID may be acquired based on the omni first and then reallocated.

The sector discovery process may be performed by various embodiments according to the sectorization type.

When the sectorization type is the type 0, that is, the beacon interval based on the sector, the channel access method may perform the sector discovery process in order of sector beacon (a sector capacity of the AP, a period of the sector beacon, a sector ID)=>sector discovery=>association (AID acquisition, a sector capacity of the station)=>beacon (a group ID). Alternatively, the channel access method may perform the sector discovery process in order of the sector beacon (the sector capacity of the AP, the period of the sector beacon)=>association (AID acquisition, the sector capacity of the station)=>sector discovery=>AID reassignment=>beacon (sector ID/group ID). Alternatively, the channel access method may perform the sector discovery process in order of the omni beacon (the sector capacity of the AP, the period of the sector beacon)=>association (AID acquisition, the sector capacity of the station)=>sector discovery during sector/omni beacon interval=>AID reassignment=>beacon (sector ID/group ID). Alternatively, the channel access method may perform the sector discovery process in order of the omni beacon (the sector capacity of the AP, the period of the sector beacon)=>sector discovery during the omni beacon interval=>association (AID acquisition, the sector capacity of the station)=>beacon (sector ID/group ID). Alternatively, the channel access method may perform the sector discovery process in order of probe request and response (the sector capacity of the AP, the sector capacity of the station, the period of the sector beacon)=>association (AID acquisition)=>sector discovery during the sector or omni beacon interval=>AID reassignment=>beacon (sector ID/group ID). Alternatively, the channel access method may perform the sector discovery process in order of probe request and response (the sector capacity of the AP, the sector capacity of the station, the period of the sector beacon)=>sector discovery during the omni beacon interval=>AID reassignment=>beacon (sector ID/group ID).

Depending on embodiments, a selection structure according to sector capabilities or sector types exchanged during the association may be included, as a structure commonly applied to the type 0 and the type 1 which are the sectorization types. In addition, the type 1 may not include sector ID information in the beacon. However, the type 1 may specify the sector ID with respect to a particular RAW.

Depending on embodiments, the channel access method may use a periodic RAW (PRAW), that is, the NDP sweep type, for training. Generally, since a sector beacon cycle mostly corresponds to a long beacon, the PRAW (NDP sweep type) for training may be needed. Here, the channel access method may additionally define a subfield (Check an NDP form in 11c sounding).

Figure 12:
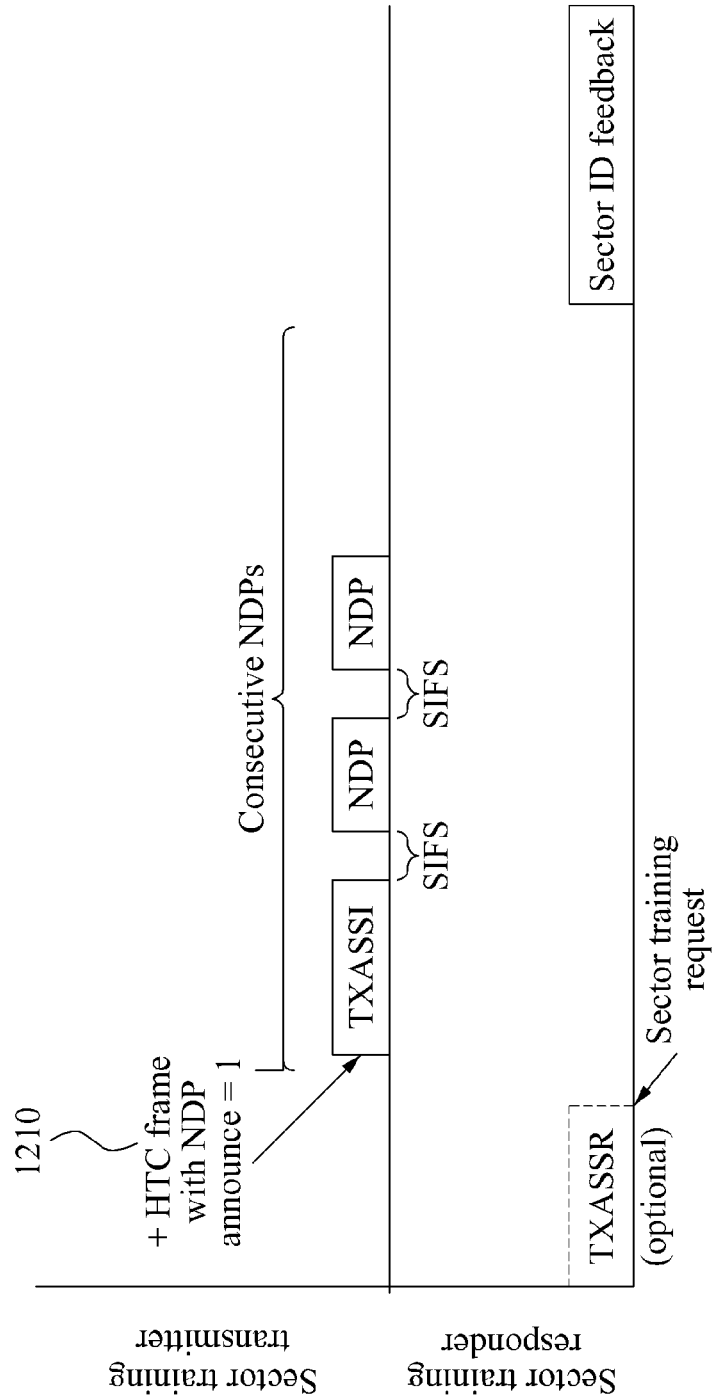
FIG. 12 is a diagram illustrating a sector training operation in a sectorization type 0, according to an embodiment of the present invention.

FIG. 12 is a diagram illustrating a sector training operation in a sectorization type 0, according to an embodiment of the present invention.

Referring to FIG. 12, the station may initialize the sector training by transmitting +HTC frame 1210 setting an Antenna Selection Command/Data (ASELC) set to 1 according to a sector training request. The AP may continuously transmit training NDPs separated by the SIFS in the TXOP. The continuous training NDPs may be TXOP holders without acknowledgement (ACK) with respect to other sectorized beams. Each training NDP may be transmitted with respect to one sector beam. The +HTC frame 1210 setting an announcement subfield to 1 may be located prior to a first training NDP frame. The location of the training NDP frame may correspond to sector IDs of the sectorized beams. The stations may perform training by estimating received signal quality corresponding to each training NDP. The stations may participate in the training by receiving sector training frames. The stations may response to a selected sector ID using a TBD sector ID feedback in the following TXOP.

According to the channel access method, in case of the announcement-NDP for Very High Throughput (VHT), different from type 1 sector discovery initialized to discover an optimal sector number by the station, type 0 sector discovery may be used by a great number of devices searching for their optimal sector IDs. Therefore, sounding signaling of a broadcasting type initialized by the AP may be very efficiently performed. To apply such a method to S1G sector sounding, at least one of a plurality of announcement-NDP frames may be an AID of TA=>AP, an AID of RA=>station, or a broadcasting type among NDPA announcement frames. TA or RA may be inserted in a SIG field of the NDP.

According to the channel access method, out of the NDPs, continuous NDPs with SIFs interposed therebetween are located in each sector beam. A current sector ID may be inserted in the SIG field of the NDP. A total number of the sectors may be inserted in the SIG field of the NDP. A following table shows an NDP 1 MHz mode format for the broadcast sector discovery, according to an embodiment of the present invention.

TABLE 3

| Field | Bit width | Comments |
| --- | --- | --- |
| Message type indicator | 4 | 1 bit: NDP indication |
|  |  | 3 bits: sub-type indication |
| RA | 0 | All broadcast |
| TA | 9 | PBSSID |
| Current sector number | 4 | From 0 to total sector number-1 |
| Total sector number | 4 | Up to 16 |
| Time to sector report | 4 | Time to sector report when current sector is chosen. TBD. |
| Reserved bit | 1 |  |
| Tail bits | 6 |  |
| CRC | 4 |  |
| TOTAL | 36 |  |

In addition, a table below shows an NDP 2 MHz mode format for the broadcast sector discovery, according to an embodiment of the present invention.

TABLE 4

| Field | Bit width | Comments |
| --- | --- | --- |
| Message type indicator | 4 | 1 bit: NDP indication |
|  |  | 3 bits: sub-type indication |
| RA | 9 | AID or "All zero" for Broadcast |
| TA | 9 | PAID |
| Current sector number | 4 | From 0 to total sector number-1 |
| Total sector number | 4 | Up to 16 |
| Time to sector report | 4 | Time to sector report when current sector is chosen. TBD. |
| Reserved bit | 4 |  |
| Tail bits | 6 |  |
| CRC | 4 |  |
| TOTAL | 48 |  |

According to the channel access method, broadcast sector NDPs with the interposed SIFs may be protected by periodic RAWs which are accessible only from the AP, for stable broadcast sector sounding. The sector NDP PRAW may be indicated by RPS I.E. of the beacon. The stations may perform sector training by estimating received signal quality corresponding to each training NDP. The stations may participate in the training by receiving the sector training frames. The stations may response to the selected sector ID using the sector ID feedback. To avoid the hidden node problem from a lot of sector reports, a sector report with respect to a particular sector selected as the optimal sector may be protected by the RAW accessible by only the station that selects the particular sector as the optimal sector. Time with respect to the RAW from the corresponding sector sounding may be expressed in the SIG field of the corresponding NDP sounding.

Depending on embodiments, the type 0 sector discovery may include sector feedback I.E. defined by MAC. The sector feedback I.E. may include a field such as TA, RA (AP for avoiding conflict from OBSS), the selected sector ID, and the like. A following table shows the sector feedback I.E. according to an embodiment of the present invention.

TABLE 5

| Elements ID | Length | RA | TA | Chosen sector ID | Reserved |
|---|---|---|---|---|---|
| 1 | 1 | 6 | 6 | 1 | |

A following table shows NDP 1 MHz mode format for sector feedback defined by PHY, according to an embodiment of the present invention. Depending on embodiments, all the NDP types for sector discovery may have only one message type.

TABLE 6

| Field | Bit width | Comments |
|---|---|---|
| Message type indicator | 4 | 1 bit: NDP indication |
| | | 3 bits: sub-type indication |
| RA | 9 | PBSSID |
| TA | 9 | PAID |
| Current sector ID | 4 | |
| Reserved bit | 0 | |
| Tail bits | 6 | |
| CRC | 4 | |
| TOTAL | 36 | |

A following table shows NDP 2 MHz mode format for sector feedback defined by PHY. All the NDP types for sector discovery may have only one message type.

TABLE 7

| Field | Bit width | Comments |
|---|---|---|
| Message type indicator | 4 | 1 bit: NDP indication |
| | | 3 bits: sub-type indication |
| RA | 9 | PBSSID |
| TA | 9 | PAID |
| Current sector ID | 4 | |
| Reserved bit | 12 | |
| Tail bits | 6 | |
| CRC | 4 | |
| TOTAL | 48 | |

According to the channel access method, the training NDP may include an NDPA format and an NDP format, that is, the sector ID. A sector report by STA may include an AID reassignment request frame. An ACK by AP may include AID reassignment.

The operation of the AP according to an embodiment of the present invention may notify the beacon sectorized to the type 0 or the type 1, and a sounding RAW time. In the type 0, dedicated sounding RAW may also be notified for stations of which sector IDs are to undefined. Depending on embodiments, the AP may not perform transmission in beacon RPS but include RAW signaling for receiving. The report RAW may be provided to prevent an inter-sector hidden node following a plurality of sounding RAWs and a hidden node by unknown STAs. In addition, slots may be allocated in the report RAW or the RAWs of each sector.

The operation of the station may include exchanging the sector capabilities information with the AP during the association. The sector ID may be allocated during the association or a temporal AID may be allocated when the sector ID is unknown yet. The station may be aware of the sectorization type through the beacon, that may be present in a current beacon interval, aware of the sounding PRAW time, and aware of a starting point of the sector report RAW according to the sounding PRAW time. The station may perform only receiving but not transmission at all during the sounding PRAW, thereby recognizing the received sector ID. Also, the station may select a preferred sector ID by measuring SNR with respect to the received sector ID. The station may wake up at the starting point of the sector report RAW and may transmit (NDS) PS-POLL together with the sector AID. The AP being aware of a reassignment object of the sector may transmit the ACK by including an AID to be newly set in the ACK. The station may wake at the starting point of the sector report RAW, transmit the NDP PS-POLL, receive the ACK from the AP, wake at a dedicated RAW starting point, thereby knowing slot information of the station, and wake in the corresponding slot. The channel access method may transmit the sector report at a starting point of the slot and may be reassigned with the AID as the ACK.

As an operation for the sectorization, the AP and the station may exchange the sector capabilities during the association to find a type of possible sectorized transmission or whether the sectorized transmission is possible. Alternatively, the AP and the station may transmit the beacons. The AP may transmit a beacon including a sector operation field (type 0 or type 1).

A following table shows the sector capabilities element in the operation for the sectorization.

TABLE 8

| Subfield | Bits | Definition | Encoding |
|---|---|---|---|
| Element ID | 8 | | |
| Length | 8 | | |
| Sectorization Beam Capable | 1 | indicate whether the AP or STA supports the sectorized operation | Set to 0 if not supported, Set to 1 if supported |
| Sectorization Type | 2 | indicate supports of which type of sectorization scheme | Set to 0 if only Type 0 Sectorization is supported, Set to 1 if only Type 1 Sectorization is supported, Set to 2 if both Type 0 Sectorization and Type 1 Sectorization are supported, Set to 3, else |
| Total Sector Number | 3 | Indicate the total number of sectors AP supports in the BSS | Set to 0 to 7 to represents number of sector 1 to 8, respectively |
| Sector ID Feedback Capable | 1 | indicate whether the STA supports sector ID Feedback | Set to 0 if not supported, Set to 1 if supported |
| Sector Training Capable | 1 | Indicate whether the AP or STA supports sector training | Set to 0 if not supported, Set to 1 if supported |
| Reserved | TBD | | |

The channel access method according to the embodiment may search for the sector ID for the station. In the type 0 sectorization, when the station is associated during the sectorized beacon interval, the channel access method may transmit the sector ID of the station to the AP. The AP may set the AID of the AP based on the sector ID. Alternatively, the station may not only detect a maximum sector for stable communication but also wait for other sectorized beacons.

During the omni beacon interval, when the station is associated, the AP may temporarily set the AID of the station until the station discovers its optimal sector. Therefore, the AP may be continuously associated with stations which have not found actual AIDs proper for the optimal sector IDs and have only the temporary AIDs. For all the stations to quickly match their minimum sectors, fast sector training of on-demand may be necessary. Also, the fast sector training of on-demand may be necessary to reduce a great air time necessary for an entire cycle of all the sectorized beacon intervals in the type 0 sectorization.

In the fast sector discovery process according to yet another embodiment, in case of the type 0 sectorization, the AP may set a periodical sounding RAW based on a number of sectorable stations in which the temporary AIDs are piled up in the AP information. During the sounding RAW with respect to all the AIDs or some limited AIDs, a non-AP STA having a corresponding AID may be prevented from being transmitted to anywhere for stable sounding. However, the non-AP STA need to wake up to hear the whole sounding. One bit indication may be used for the foregoing operation of new stations. The bit may be applied to explicit FAST channel discovery.

A following table shows RAW parameter set elements according to an embodiment.

Figure 13:
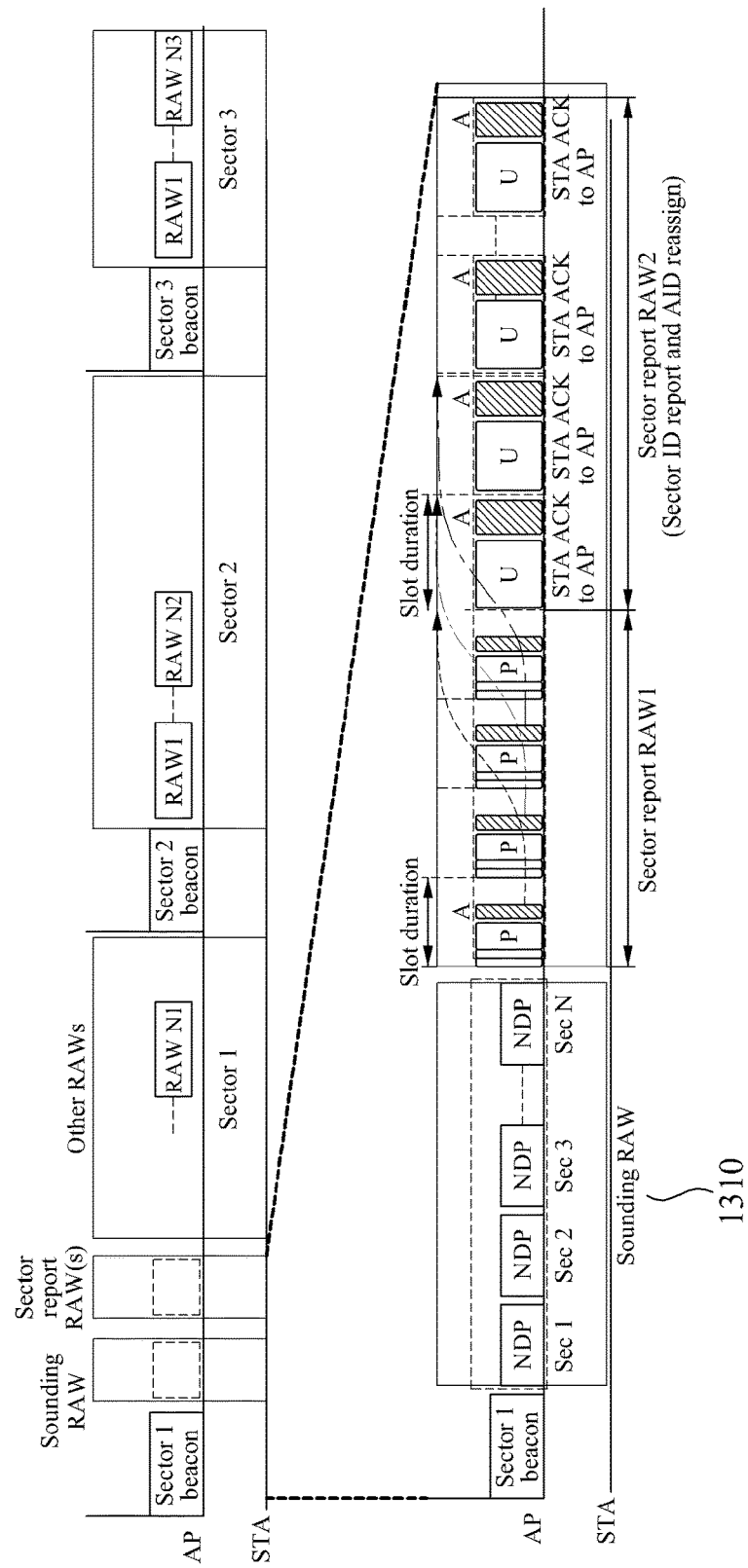
FIG. 13 is a diagram illustrating a sounding restricted access window (RAW) and a sector report RAW according to an embodiment of the present invention.

Referring to FIG. 13, the channel access method according to the embodiment may use a +HTC NDPA-NDP field along with modification in a sounding RAW 1310. NDPA may be omitted from the sector sounding. NDP CTS may be used for NDP sweep for sector training. For more stable sector discovery, a sector ID for an NDP component may be added to a SIG field of the NDP CTS. TBD fits for NAV setting in the stations may be defined to protect currently accessing mediums and the stations. Since only the AP is capable of data transmission during the sounding RAW, the sector ID may share a duration field. A following table shows an NDP component field according to an embodiment.

TABLE 10

| | Message Type Indicator | Address Indicator | RA Address/ Partial BSSID | Duration/ Sector ID | EarlySector Indicator | Reserved | CRC | Tail |
|---|---|---|---|---|---|---|---|---|
| Bits | TBD | 1 | TBD | TBD | TBD (1) | TBD | 4 | 6 |

In the channel access method according to the embodiment, the AP may exchange sector capabilities information with the stations during the association. The AP may notify the beacon (type 0 sectorization) of starting points of the sounding RAW and the sector report RAWs. The AP may notify a dedicated sounding RAW for the stations of which sector IDs are undefined. The AP may not perform transmission to the beacon RPS but include dedicated RAW signaling for receiving. Here, a report RAW may be provided to prevent an inter-sector hidden node following a plurality of sounding RAWs and a hidden node by unknown STAs. In addition, the AP may allocate slots in a report

TABLE 9

| Feature | Value | Interpretation |
|---|---|---|
| Page ID | TBD bits | Indicates the page index for hierarchical AID (based on hierarchical AID) of the allocated group |
| Block Offset | TBD bits | Assuming 32 blocks per page, these bits indicate the starting block index of the allocated group |
| Block Range | TBD bits | Indicates the number of blocks (starting from the block offset) for the allocated group |
| RAW Start Time | 8 bits | Duration in TU from end of beacon transmission to RAW Start time |
| RAW Duration | TBD bits | Duration of RAW in TU |
| Access restricted to paged STA only | 2 bits | Bit 1: Set to 1 if only STA with their TIM bit set to 1 are allowed to perform UL transmissions Bit 2: Set to 1 if RAW is reserved for frames with duration smaller than slot duration, such as PS-Polls/trigger frames (ignored if Bit 1 is not set) |
| Group/Resource allocation frame indication | 1 bit | Set to 1 to indicate if STAs need to wake up at the beginning of the RAW to receive group addressed frames such as resource allocation (format of the resource allocation frame TBD) |
| Sounding RAW | 1 bit | Set to 1 to indicate if non-AP STAs are prohibited to transmit but have to listen the entire RAWSet to 0 otherwise |
| Slot definition | TBD bits | Include - Slot duration signaling - Slot assignment to STA - Cross boundary transmissions allowed/not allowed Format is TBD |

FIG. 13 is a diagram illustrating a sounding RAW and a sector report RAW according to an embodiment of the present invention.

RAW1 or the RAWs of each sector if necessary, and may receive PS-POLL from the stations which are to report the sector IDs. The AP having received the PS-POLL from the stations may notify a corresponding dedicated report slot time of a sector report RAW2 through ACK with respect to a temporary ID. When reported with a preferred sector ID in each slot of the sector report RAW2, the AP may notify an AID to be newly allocated, as the ACK.

The station may exchange the sector capabilities information with the AP during the association. Depending on embodiments, the sector ID may be allocated during the association, or a temporary AID may be allocated since the sector ID is unknown yet. The station may be aware of the sectorization type through the beacon, aware of the sounding PRAW time, which may be present in a current beacon interval, and aware of a starting point of the sector report RAW according to the sounding PRAW time. The station may perform only receiving but not transmission at all during the sounding PRAW, thereby recognizing the received sector ID. Also, the station may select a preferred sector ID by measuring SNR with respect to the received sector ID. The station may wake up at the starting point of the sector report RAW1 and may transmit (NDS) PS-POLL by the current temporary AID. Therefore, the AP becomes aware of reassignment objects of the sector and may receive information on a corresponding report slot of the sector report RAW2 in the ACK. The station may wake up at the corresponding report slot of the sector report RAW2, transmit the NDP sector report, and accordingly be confirmed with respect to the sector discovery by receiving the ACK including the AID allocation information from the AP.

A following table shows fields of the sector report frame (1 MHz) in the channel access method according to the embodiment. Here, the sector report may be transmitted from the station during the sector report RAW2.

TABLE 11

| Field | Bit width | Comments |
|---|---|---|
| Message type indicator | 4 | 1 bit: NDP indication<br>3 bits: sub-type indication |
| RA | 9 | PBSSID |
| TA | 9 | PAID |
| Preferred sector ID | 3 | |
| Reserved bit | 1 | |
| Tail bits | 6 | |
| CRC | 4 | |
| TOTAL | 36 | |

A following table shows fields of the sector report frame (2 MHz) in the channel access method according to the embodiment. Here, the sector report may be transmitted from the station during the sector report RAW2.

TABLE 12

| Field | Bit width | Comments |
|---|---|---|
| Message type indicator | 4 | 1 bit: NDP indication<br>3 bits: sub-type indication |

TABLE 12-continued

| Field | Bit width | Comments |
|---|---|---|
| RA | 9 | PBSSID |
| TA | 9 | PAID |
| Preferred sector ID | 3 | |
| Reserved bit | 13 | SNR (5 bits) + Received Sector Bitmap (8 bits) may be considered |
| Tail bits | 6 | |
| CRC | 4 | |
| TOTAL | 48 | |

In the channel access method according to the embodiment, a sector confirm frame may be transmitted from the AP during the sector report RAW2. Here, the sector confirm frame may include an AID response element format as shown in a table below.

TABLE 13

| | Element ID | Length | AID | AID Switch Count | Wakeup Interval |
|---|---|---|---|---|---|
| Octets: | 1 | 1 | 2 | 1 | 2 |

As described above, when there is remaining time in the sector interval, the channel access method may reuse the remaining time for other sectors.

It is hard that the sectorized beacon intervals have the same number of corresponding sectorized stations. Therefore, the sectorized beacon intervals need to be allowed for reuse for omni directional transmission of the AP. After transmission of the sector data during the beacon interval is completed, other sectors may also be reused. When the sector data transmission during the beacon interval is completed, other sectors or omni sectors may be allowed to be reused for a remaining interval until the next beacon.

The sync frame may be transmitted to all the sectors to inform that the remaining duration of the sectorized beacon interval may be reused in other sectors when necessary. A following table shows SIG fields of the NDP CTS, that is, the sync frame as a switch for all the sectors, according to an embodiment.

TABLE 14

| | Message Type Indicator | Address Indicator | RA Address/ Partial BSSID | Duration | Early Sector Indicator | Switch to All sector | Reserved | CRC | Tail |
|---|---|---|---|---|---|---|---|---|---|
| Bits | TBD | 1 | TBD | TBD | TBD(1) | 1 | TBD | 4 | 6 |

The channel access method may discover the sector ID for the station. In case of the type 1 sectorization, since the beacons are the omni beacons, all the stations may be associated without sector information. In addition, the sector training using +HTC NDPA-NDPs may be accepted according to the on-demand of the sector.

The above described channel access method may be directly performed by a channel access apparatus. The channel access apparatus according to an embodiment of the present invention may be a module inserted in an AP.

The channel accessing apparatus may include a beacon transmission unit and a data transmission and reception unit.

The beacon transmission unit may transmit a sector beacon with respect to any one sector of a plurality of sectors. In addition, the data transmission and reception unit may transmit and receive data with respect to at least one station in any one sector during a predetermined sector interval. Additionally, the beacon transmission unit and the data transmission and reception unit may perform sector beacon transmission and data transmission and reception in sequence, with respect to remaining sectors of the plurality of sectors.

The beacon transmission unit may transmit an omni beacon with respect to all of the plurality of sectors. The data transmission and reception unit may transmit and receive data with respect to at least one station of the plurality of sectors during a predetermined BSS interval.

Depending on embodiments, the channel access apparatus may further include a sector discovery unit. The sector discovery unit may proceed with the sector discovery process by performing sector sweep.

Since the channel access method described with reference to FIGS. 1 through 13 may be directly applied to the channel access apparatus, a detailed description will not be repeated.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method for a sector training operation by an access point (AP), the method comprising:
transmitting a beacon frame including restricted access window (RAW) assignment information, wherein the RAW assignment information includes assignment information for a sector sounding RAW and a sector reporting RAW;
transmitting at least one No Data Protocol (NDP) type frames for sector training in the sector sounding RAW; and
receiving at least one feedback frame each including a selected sector identification (ID) from a station (STA) in a sector reporting RAW.

2. The method of claim 1, wherein when multiple STAs transmits the feedback frames including respective sector IDs, the feedback frames are protected by the sector reporting RAW indicated in the beacon frame.

3. The method of claim 1, wherein the sector reporting RAW is assigned after the sector sounding RAW for fast sector discovery of multiple STAs.

4. The method of claim 1, wherein when consecutive NDP type frame for sector training are transmitted in the sector sounding RAW, the consecutive NDP type frames are separated by a Short Inter Frame Spacing (SIFS).

5. The method of claim 1, wherein when a plurality of NDP type frame for sector training are transmitted in the sector sounding RAW, the plurality of NDP type frames correspond to sector IDs in ascending order starting with a lowest sector ID.

6. The method of claim 1, wherein the RAW assignment information includes information on a time position and a type of a RAW.

7. The method of claim 1, wherein the sector sounding RAW is a periodic RAW.

8. The method of claim 1, further comprising:
receiving a request for sector training from a STA,
wherein the at least one NDP type frame is transmitted in response to the request.

9. The method of claim 1, further comprising:
transmitting a confirmation in response to the feedback frame a SIFS after the feedback frame.

10. The method of claim 1, wherein an NDP type frame includes Short Training Field (STF) field, a Long Training Field (LTF) field, and a Signal (SIG) field without a Data field.

11. The method of claim 10, wherein the SIG field of the at least one NDP type frame includes an address of the AP.

12. A method for a sector training operation by a station (STA), the method comprising:
receiving, from an access point (AP), a beacon frame including restricted access window (RAW) assignment information, wherein the RAW assignment information includes assignment information for a sector sounding RAW and a sector reporting RAW;
receiving at least one No Data Protocol (NDP) type frames for sector training in the sector sounding RAW; and
transmitting a feedback frame including a selected sector identification (ID) in a sector reporting RAW.

13. An apparatus of a station (STA) for a sector training operation, the apparatus comprising:
a transmitter;
a receiver; and
a processor,
wherein the processor is configured to:
cause the receiver to receive, from an access point (AP), a beacon frame including restricted access window (RAW) assignment information, wherein the RAW assignment information includes assignment information for a sector sounding RAW and a sector reporting RAW;
cause the receiver to receive at least one No Data Protocol (NDP) type frames for sector training in the sector sounding RAW; and cause the transmitter to transmit a feedback frame including a selected sector identification (ID) in a sector reporting RAW.

\* \* \* \* \*